Jan. 26, 1932.  H. E. MUCHNIC  1,842,979
BEARING AND METHOD OF CONSTRUCTING SAME
Original Filed Aug. 9, 1926
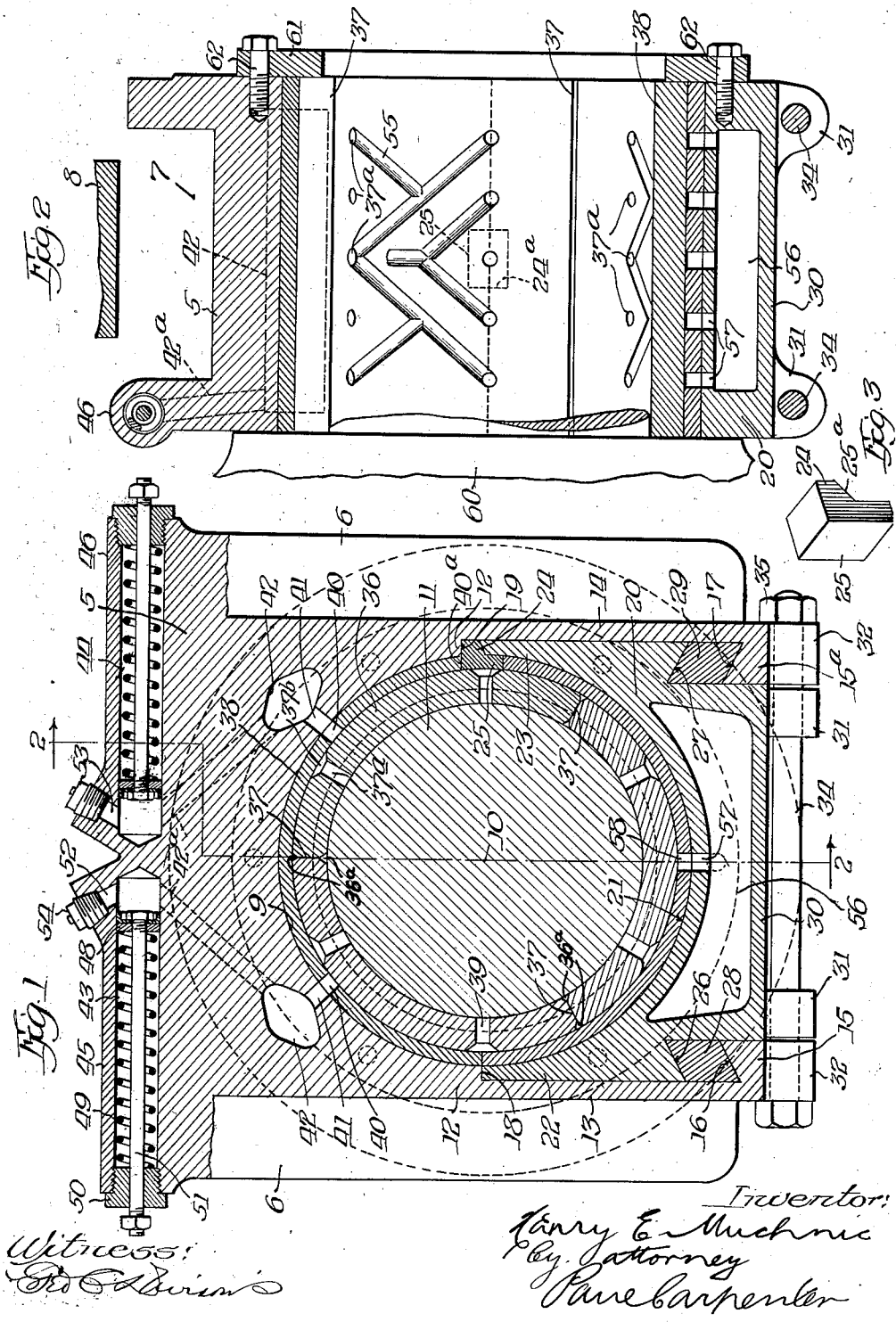

Patented Jan. 26, 1932

1,842,979

UNITED STATES PATENT OFFICE

HENRY E. MUCHNIC, OF ATCHISON, KANSAS, ASSIGNOR TO LOCOMOTIVE FINISHED MATERIAL COMPANY, OF ATCHISON, KANSAS, A CORPORATION OF KANSAS

BEARING AND METHOD OF CONSTRUCTING SAME

Original application filed August 9, 1926, Serial No. 128,223. Divided and this application filed April 25, 1927. Serial No. 186,267.

This invention relates broadly to bearings and more particularly to that type of bearing commonly employed in locomotives and termed a driving journal box, this invention specifically relating to an improved structure of the bearing and supporting means which includes improved lubricating means.

This application is a division of my co-pending application Serial Number 128,223.

It will be understood by those skilled in the art that in a steam locomotive the driving wheel axles are supported for rotation in parallel frames provided with recesses which receive the driving box in which the journal, that is, the brass, is secured, by pressing. Many attempts have been made to reduce and eliminate the distortion of the "brass" due to pounding, it being common practice to provide a bearing brass which overlies the axle and which receives substantially all of the pressure of the locomotive frames on the axle and these bearing brasses have, in most instances and in practically all railway practice today, been made substantially semi-circular, that is, only the upper part of the bearing actually is a bearing. In this type of driving box, the brass, owing to the longitudinal thrust, tends to become pounded out of shape.

In order to overcome the disadvantages of the present driving box I have provided a device hereinafter described, and its principal objects and advantages reside in the provision shown of an improved type of driving box including the bearing itself and associated elements; the provision of an improved driving box characterized by the embodiment therein of a substantially continuous bearing, that is, a bearing "brass" which completely encircles the axle; the provision of an improved driving box bearing in which the bearing member is floating; that is, revoluble in the box both relatively to and with the axle or shaft; the provision of an improved bearing in which the "sides", "top" and "bottom" of the bearing function to eliminate the pounding and consequent distortion of the bearing in service; the provision of an improved driving box of the character described in which a revoluble bushing (brass) is employed to eliminate concentrated wear, that is, the concentration of the wear of the bearing in one spot, the provision of an improved bearing having automatic lubricating means; and the provision of a bearing of the character described which is substantially continuous and whereby strains are thereby distributed throughout the bearing member and the life of the bearing therefore increased.

In the prior art devices known to me, when repairing a locomotive driving box, that is, renewing the brass, it is necessary that the wheels and axle be dropped either into a pit or the whole locomotive hoisted off the wheels in order that the driving box may be removed from the frame for receiving the new brass. In the present invention, I provide an arrangement whereby renewal of the brasses may be simply accomplished by jacking up the box against the tension of the springs, blocking the springs and allowing the box to be freely moved above the axle so as to remove the worn brasses and replace the same with new brasses, this feature being set forth hereinafter in detail.

As will be obvious by a comparison between this application and my co-pending application referred to, the present application is more particularly directed to the improved method herein described employed for constructing the bearing member per se, whereby a high degree of accuracy in the fitting of said bearing member may be accomplished at the outset and thus avoid the practice in the past of inserting the brass not trued up and allowing the brass to wear to a true fit.

This invention also is characterized by the provision of an improved method of constructing the brasses employed whereby an accurate multiple brass forming a substantially continuous bearing surface can be provided.

The foregoing and such other objects and advantages as may appear or be pointed out as this description proceeds are embodied in a structure illustrated in the accompanying drawings in which:

Figure 1 is a vertical sectional view of the device of this invention taken on a plane transverse to the axis of rotation, and Figure 2 is a vertical sectional view taken on the line 2—2 of Figure 1 looking in the direction indicated by the arrows.

Figure 3 is an enlarged perspective view of a detail.

Referring now more particularly to the drawings, I provide a box member, generally designated 5, this box member being generally rectangular in contour and provided at its lateral edges with vertical channels 6—6 which afford flanges between which the vertical lugs of the locomotive frame are received whereby the box may vertically move against the usual spring elements. The upper portion of the driving box 5 is provided with a channel 7 in which the usual spring yoke, not shown, may be received.

The box 5 is provided at its medial portion with a transverse semi-cylindrical recess 9 forming a surface having the center 10 of the driving axle 11 as its center of curvature. The surface 9 is substantially semi-cylindrical and terminates at or adjacent the points 12—12, the end portions of the box 5 being there formed with vertical side walls 13 and 14, which latter at their lower extremities terminate with flanges 15 and 16, the inner surfaces of said walls, that is, the surfaces 16 and 17, respectively, being inclined toward the walls 13 and 14, as best illustrated in Figure 1.

The curved surface 9 forms, with the inner surface of the wall 13, shoulders 18 and 19 for a purpose which will presently appear.

The lower part of the box, that is, the open bottom thereof, is closed by a cellar member generally designated 20 which, as will hereinafter appear, serves to form, with certain other elements, the lower retaining portion of the box 5. The cellar member is provided with a curved wall 21 described about the same center as that of the wall 9 and formed on upwardly extending portions 22 and 23, the upper end of the portion 22 resting against the shoulder 18, and the outer surface thereof resting against the inner surface of the wall 13. In the case of the part 23, this is shaped to receive the lateral extension 24 of a key member 25 which serves a purpose which will hereinafter appear, the upper edge, however, of the extension 23 resting upon the shoulder 19 with the exception of the distance required to accommodate the key. An inspection of Figure 2 will show the key 25 as disposed approximately midway the length of the bearing.

The cellar member 20 is provided with inclined surfaces 26 and 27 complemental to the surfaces 16 and 17, and gib keys 28 and 29 are inserted between surfaces for snugly retaining the member 20 in position. Additionally, the lower wall 30 of the member 20 is provided with a plurality of lugs 31 arranged in pairs complemental to pairs of lugs 32 formed on the bottom flanges 15 and 15a of the walls 13 and 14, and these lugs are suitably apertured to receive transverse retaining bolts 34 provided with nuts 35.

The bearing proper of the present invention preferably includes the bearing member 36 which latter is, as shown in Figure 1, made up of a plurality of sections forming a substantially complete annulus, the bearing member being termed a "brass" because it is usually made of brass and is divided, as indicated at 37, 37, into three sections, the joints being substantially 120° apart. Any number of sections desired may be employed but I have found that this construction facilitates renewal of the bearing member and at the same time does not provide an undesirable number of joints. The bearing member, though removable, of course snugly engages the axle 11 and said bearing member is freely revoluble both with and relatively to the axle.

In the construction of the sections of the brass 36 I find it is desirable to first employ an annulus of brass and to turn the same on its inside diameter accurately to snugly fit the locomotive axle or shaft, as the case may be. I then saw the annulus into three sections by making saw cuts approximately 120° apart and then bevelling the adjacent abutting ends as at 36a and allowing thereby a clearance between the adjacent ends of the sections so that no distortion or binding can then take place, due to expansion when heated. By forming the bearing member 36 accurately to fit the axle at the outset, it is not necessary for the bearing member to become worn in service before the sections thereof accurately fit the axle.

Another advantage of forming the annulus in the manner prescribed above is that when the sections are assembled on the axle between the surfaces thereof and the liner, a certain amount of play will be allowed between the segments. By cutting the segments in the manner set out, this play will allow for unequal expansion and contraction of the inner and outer portions of each segment in the event that the inner surface of contact between the segments and the axle should become overheated, or, conversely, in the event that the outer surface of contact between the segments and the liner should become overheated. Ordinarily, and without the allowance brought about by sawing the sections, such heating of either one of the bearing surfaces would result in jamming the segments and thus resulting in overheating of the entire bearing. The allowance of space at the points 37 is not shown in the drawings, because this allowance is relatively fine, and it is only sufficient to allow for the unequal expansion and contraction referred to. The beveling of the corners also materially assists in attaining this function.

A steel liner in the form of a cylindrical sectionalized member 38 substantially completely encircles the bushing or bearing member 36, said steel liner being formed preferably in two halves divided as at 39 and having adjacent ends as at 40a engaging the key 25. This key serves to prevent rotation of the liner and facilitates assembly of the bearing by retaining the upper part of the liner in desired position while the lower part thereof and the other parts of the bearings are applied.

The key 25, as will be seen from Figure 3, has a body portion and a laterally disposed portion 24 provided with an inclined surface 25a which facilitates its introduction into position in the recess 24a afforded in the member 23, this key thereby serving to have its body portion disposed to abut the opposite portions of the liner 38.

The liner 38 in its upper portion is provided with a plurality of openings 40, 40 which communicate with openings 41, 41, leading from passageways 42, 42, said passageways being formed in the body of the yoke 5 and communicating with supply passageways 42a leading from the lubricant containing pockets 43 and 44 located in the cylindrical enlargements 45 and 46 formed in the upper portion of the box 5. From an inspection of Figure 2 it will be seen that the passageways 42 extend substantially entirely across the top of the bearing and may communicate, by a plurality of the openings 41 and 40, with the bearing member 36.

As best shown in Figure 1, the lubricant pockets 43 and 44 are arranged in relatively opposed relationship and as they are substantially identical in construction, but one of the same will be described. Referring to the lubricant pocket 43, this latter is substantially cylindrical and has a piston 48 slidable therein against the tension of a helical spring 49, which latter is retained in position by a plug 50 threading into the outer end of the lubricant pocket. The spring 49 tends to force the lubricant out of the pockets 43 and 44 to the bearing surface. A piston rod 51 guides the piston and as said piston rod projects beyond the plug 50, it serves as a means to indicate the quantity of lubricant in said pocket. Lubricant is introduced into the pockets 43 and 44 through openings 52 and 53 provided with a suitable check valve coupling member 53 of any approved design whereby a grease gun may be applied for introducing the lubricant.

Again reverting to the bushing or brass 36, it will be observed that the latter between its joints 37 is formed with a plurality of complemental ports 37a which form passageways for the lubricant introduced between the liner and the bushing to pass to the surface of the axle 11. I also find it convenient and desirable to internally groove the surfaces of the sections of the bushing as indicated at 55 for hastening the distribution of the lubricant throughout the bearing surface. As will be observed from an inspection of the drawings, the opening or ports 37a are provided with enlarged outer portions or mouths 37b so that the lubricant finds easy access to these ports from the passageways 40 and 41.

For ordinary lubrication of the bearing, the member 20 is provided with a cellar 56 communicating by a central opening 57 to the opening 58 in the lower half of the liner 38, the cellar containing an additional lubricant which is conducted through the openings 57 and 58 through the liner to the bearing bushing 36 and, as said bushing is rotated, the openings 37a pick up the lubricant and conduct it to the axle.

It will be observed that the advantages accruing to this invention reside particularly in the absence of any pound on the bearing due to uneven supporting of the axle and any displacement of the axle in the bearing longitudinally of the locomotive being taken up by some part of the bushing member which is, of course, constantly changing.

It will be understood, of course, that while the invention is disclosed as applied to a locomotive driving box, it may be employed in part or in its entirety in other types of bearings in general.

In assembling the device of this invention, the manner of assembly depends, of course, on whether this is being done originally when the device is placed on the axis or whether it is done to an engine for repair purposes. As one of the principal advantages of this invention resides in the facility with which repairs can be made, it will be pointed out that assuming the device is in position on a locomotive, as shown, the gib keys 28 and 29 and bolts 34 are first removed and the cellar member 20 allowed to drop down on to the flanges 15 and 15a. The driving box is then jacked up against the tension of the locomotive springs, not shown, and a block may then be placed between the springs and the top of the locomotive frame, thereby taking the weight of that part of the engine off the driving box whereupon it is freely movable relatively to the axle and to the locomotive frame. The retaining ring 61 is then removed and the worn bushings, and, if necessary, the liners, removed along the axle. New bushings and liners are then inserted in position, and the cellar member raised, gib keys inserted, and the bolts 34 inserted and tightened. The key 25 is, of course, placed in its proper position to retain the liners against rotation. The springs will then again be jacked up and the retaining block removed, allowing the spring yoke to again engage the upper part of the driving box, and the engine is again ready for service. It will be obvious that the advantages are in this structure over the prior art device wherein it is necessary to drop driving wheels into a pit in order to remove the journal box for replacing the brass. It will be understood, of course, that the liner 38 is not absolutely essential but is employed to eliminate wear on the driving box itself. In some installations it may be desirable to eliminate the liner and permit the bushing to rotate against the grooved surface of the box and cellar member 20.

Having thus described my invention and illustrated its use, what I claim as new and desire to secure by Letters Patent is:

1. The method of making a floating bearing member which includes as steps thereof, turning an annulus of metal to form internal and external peripheral bearing surfaces substantially accurately fitting the surfaces between which the bearing member finally is to float, then cutting said annulus into a plurality of segments, and finishing off the adjacent ends of said segments so that when applied in operative position spaces between the segments allow for unequal expansion and contraction of the inner and outer peripheral surfaces thereof.

2. The method of making a floating bearing member which includes as steps thereof, forming an annulus of metal, shaping the inner and outer peripheral bearing surfaces thereof substantially to accurately fit the surfaces between which the bearing member finally is to float, then cutting said annulus into a plurality of segments, and beveling off the adjacent ends of said segments to afford a space therebetween when they are assembled in operative position between the surfaces which they are finally to engage so as to allow for unequal expansion and contraction of said segments.

In testimony whereof, I have hereunto signed my name.

HENRY E. MUCHNIC.